(12) United States Patent
Kang et al.

(10) Patent No.: US 10,676,863 B2
(45) Date of Patent: Jun. 9, 2020

(54) ECO-FRIENDLY ARTIFICIAL LEATHER FOR INTERIOR OF AUTOMOBILE AND MANUFACTURING METHOD THEREOF

(71) Applicants: Hyundai Motor Company, Seoul (KR); Kia Motors Corporation, Seoul (KR); BAIKSAN Co., Ltd., Siheung-si (KR); HYUNDAI DYMOS INC., Seosan-si (KR)

(72) Inventors: Gun Kang, Seoul (KR); Mi Jung Yun, Yongin-si (KR); Soon Joon Jung, Seoul (KR); Hye Min Lee, Seoul (KR); Yoon Jong Cha, Icheon (KR); Seong Deuk An, Gunpo-si (KR); Seung Ho Cho, Hwaseong-si (KR); Jae Yong Ko, Suwon-si (KR); Jun Ho Song, Hwaseong-si (KR); Hye Rin Choi, Hwaseong-si (KR)

(73) Assignees: Hyundai Motor Company, Seoul (KR); Kia Motors Corporation, Seoul (KR); BAIKSAN Co., Ltd., Siheung-si (KR); HYUNDAI DYMOS INC., Seosan-si (KR)

( * ) Notice: Subject to any disclaimer, the term of this patent is extended or adjusted under 35 U.S.C. 154(b) by 212 days.

(21) Appl. No.: 15/820,252

(22) Filed: Nov. 21, 2017

(65) Prior Publication Data
US 2018/0334773 A1    Nov. 22, 2018

(30) Foreign Application Priority Data
May 18, 2017    (KR) .................. 10-2017-0061497

(51) Int. Cl.
*D06N 3/00* (2006.01)
*C09J 175/06* (2006.01)
(Continued)

(52) U.S. Cl.
CPC ............ *D06N 3/0011* (2013.01); *B32B 5/022* (2013.01); *B32B 7/06* (2013.01); *B32B 7/12* (2013.01); *B32B 27/12* (2013.01); *B32B 27/40* (2013.01); *B32B 37/12* (2013.01); *B60N 2/5891* (2013.01); *C08G 18/12* (2013.01);
(Continued)

(58) Field of Classification Search
USPC ........................................ 428/423.3, 423.1
See application file for complete search history.

(56) References Cited

U.S. PATENT DOCUMENTS

2014/0212676 A1*  7/2014  Tetsui .................... C08G 18/44
                                                    428/423.3

FOREIGN PATENT DOCUMENTS

KR           10-0389934 B1        7/2003

* cited by examiner

*Primary Examiner* — Lynda Salvatore
(74) *Attorney, Agent, or Firm* — Morgan, Lewis & Bockius LLP (57) ABSTRACT

Provided herein is an eco-friendly artificial leather for an interior of an automobile and a manufacturing method thereof. The eco-friendly product is manufactured using a method that is compatible with various environmental regulations such as reduction of greenhouse gas emissions. The artificial leather includes a bio urethane-containing skin surface layer which uses biomass-derived components extracted from vegetable components, a solvent-free bio urethane adhesive layer, and a bio fiber base layer. The layers are sequentially stacked to minimize the use of organic solvents and components that are harmful to the human body.

12 Claims, 3 Drawing Sheets

(51) Int. Cl.

| | |
|---|---|
| *B32B 5/02* | (2006.01) |
| *B32B 7/12* | (2006.01) |
| *B32B 7/06* | (2019.01) |
| *B32B 37/12* | (2006.01) |
| *B32B 27/40* | (2006.01) |
| *B60N 2/58* | (2006.01) |
| *B32B 27/12* | (2006.01) |
| *C08G 18/76* | (2006.01) |
| *C08G 18/42* | (2006.01) |
| *C08G 18/44* | (2006.01) |
| *C08G 18/12* | (2006.01) |
| *C08G 18/75* | (2006.01) |
| *C08G 18/66* | (2006.01) |
| *C08G 18/32* | (2006.01) |
| *D06N 3/14* | (2006.01) |

(52) U.S. Cl.
CPC ..... *C08G 18/3206* (2013.01); *C08G 18/4202* (2013.01); *C08G 18/44* (2013.01); *C08G 18/664* (2013.01); *C08G 18/758* (2013.01); *C08G 18/7671* (2013.01); *C09J 175/06* (2013.01); *D06N 3/0006* (2013.01); *D06N 3/0036* (2013.01); *D06N 3/146* (2013.01); *B32B 2605/003* (2013.01); *D06N 2201/0263* (2013.01); *D06N 2211/28* (2013.01)

ECO-FRIENDLY ARTIFICIAL LEATHER FOR INTERIOR OF AUTOMOBILE AND MANUFACTURING METHOD THEREOF

CROSS-REFERENCE(S) TO RELATED APPLICATIONS

The present application claims under 35 U.S.C. § 119(a) the benefit of priority to Korean Patent Application No. 10-2017-0061497, filed on May 18, 2017, the entire contents of which is incorporated herein by this reference for all purposes.

BACKGROUND OF THE INVENTION

Field of the Invention

The present invention relates to eco-friendly artificial leather for an interior of an automobile and a manufacturing method thereof. More particularly, the present invention relates to an eco-friendly artificial leather for an interior of an automobile, which is configured for providing an eco-friendly product suitable for a reduction in greenhouse gas emissions and various environmental regulations. The artificial leather is manufactured such that a bio urethane-including skin surface layer which uses biomass-derived components extracted from vegetable components, a solvent-free bio urethane adhesive layer, and a bio fiber base layer are sequentially stacked to minimize the use of organic solvents and components harmful to the human body during the manufacturing method thereof.

Description of Related Art

A general process of manufacturing an artificial leather includes forming a film on the surface of skin by applying a urethane resin blended liquid synthesized using a polyol based on petroleum chemical resources and a chain extender in the presence of an organic solvent which harmful to the human body. In some cases, the method also includes applying dimethyl formamide (DMF) and methyl ethyl ketone (MEK) onto a release paper on which various patterns are formed, and drying the urethane resin blended liquid.

Onto the subsequently formed urethane film, a urethane adhesive synthesized from a petroleum chemical raw material including an organic solvent is applied, and a cross-linking reaction is conducted, and then a method for laminating the urethane film with a general fiber base is used to impart proper tacky characteristics. The process of manufacturing the artificial leather and an adhesive layer disposed on an intermediate layer of the product includes using a large amount of an organic solvent (e.g., DMF and MEK). A separate drying process can be performed to minimize the remaining amounts of organic solvent, however it is difficult to completely remove the residual organic solvent.

As the artificial leather in the related art utilizes raw materials derived from petroleum chemical resources, such artificial leather has the disadvantages in that it is difficult to actively conform to international environmental regulations such as the reduction in the amount of greenhouse gases emitted, and the reduction of emitted components that are harmful to the human body and remain in the environment.

Methods for reducing the amount of organic solvent are under development, for instance, studies directed to replacing an organic solvent with an aqueous urethane or a 100% solid solvent-free urethane has been conducted. Studies to develop of an artificial leather for an interior of an automobile, which utilizes biomass-derived raw materials and the application cases thereof are just beginning undertaken.

Korean Patent No. 10-0389934 discloses a method for processing an artificial leather product manufactured by replacing a urethane including an organic solvent in the related art with an aqueous urethane material using an aqueous urethane-based adhesive. However, the aqueous urethane-based adhesive has disadvantages in that it is difficult to adjust the molecular weight during the synthesis of the adhesive, and hydrolysis resistance, adhesive strength, durability, and the like are weak due to limited synthetic raw materials. Furthermore, about 50% to 60% of moisture is included in an adhesive raw material, wherein energy costs become excessive when the adhesive raw material is dried, and it is difficult to adjust the proper tacky characteristics during the process of laminating the adhesive raw material with a fiber base.

Accordingly, the prior art process has disadvantages in production stability, product reproducibility, and adhesive strength. For instances, the prior art process is significantly lacking when compared to the process of utilizing a urethane adhesive containing the organic solvent. Furthermore, since raw materials derived from petroleum chemical resources are utilized, one would not expect to reduce greenhouse gas emission using the prior art process.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

To solve the aforementioned problems, provided herein is an eco-friendly artificial leather that can be manufactured according to the method described herein. Compared to prior art methods, the method of manufacturing described below provides a reduction of greenhouse gas emissions and conforms to various environmental regulations. This artificial leather includes a bio urethane-containing skin surface layer which uses biomass-derived components extracted from vegetable components, a solvent-free bio urethane adhesive layer, and a bio fiber base layer, all of which are sequentially stacked. This minimizes the use of organic solvents and components that are harmful to the human body.

Accordingly, various aspects of the present invention are directed to providing eco-friendly artificial leather that can be placed an interior of an automobile.

Various aspects of the present invention are directed to providing a method for manufacturing an eco-friendly artificial leather that can be placed an interior of an automobile.

Various aspects of the present invention are directed to providing eco-friendly artificial leather for an interior of an automobile including a bio urethane-containing skin surface layer; a solvent-free bio urethane adhesive layer; and a bio fiber base layer are sequentially stacked. The solvent-free bio urethane adhesive layer includes a hydroxyl group end urethane prepolymer prepared by polymerizing 2 to 5 parts by weight of an isocyanate-based compound with 100 parts by weight of a polyol mixture. The polyol mixture includes (a) a carbonate polyol having a functionality of 2 or more and a number average molecular weight of 500 to 3,000, (2) a biomass-derived crystalline ester polyol having a solidification temperature of 18° C. to 55° C. and a number average molecular weight of 1,000 to 3,000, and (2) a biomass-derived chain extender having a functionality of 3 or more and a number average molecular weight of 50 to 500. The bio fiber base layer includes a composite spun fiber including a polymer resin and a biomass-derived polytrimethylene terephthalate, wherein the polymer resin is selected from the group consisting of polyethylene terephthalate, polyacrylate, co-polyethylene terephthalate, and polylactide, and is mixed with the biomass-derived polytrimethylene terephthalate at a weight ratio of 1:1.

Various aspects of the present invention are directed to a method for manufacturing eco-friendly artificial leather for an interior of an automobile. The method includes (a) forming a bio urethane skin surface layer on a release paper; (b) forming a solvent-free bio urethane adhesive layer by applying a solvent-free bio urethane composition onto the bio urethane skin surface layer; and (c) forming a bio fiber base layer on the solvent-free bio urethane adhesive layer, wherein the solvent-free bio urethane adhesive composition includes a hydroxyl group end urethane prepolymer prepared by polymerizing 2 to 5 parts by weight of an isocyanate-based compound with 100 parts by weight of a polyol mixture including (1) a carbonate polyol having a functionality of 2 or more and a number average molecular weight of 500 to 3,000, (2) a biomass-derived crystalline ester polyol having a solidification temperature of 18° C. to 55° C. and a number average molecular weight of 1,000 to 3,000, and (3) a biomass-derived chain extender having a functionality of 3 or more and an average molecular weight of 50 to 500, and the bio fiber base layer includes a composite spun fiber including a polymer resin and a biomass-derived polytrimethylene terephthalate. The polymer resin is selected from the group consisting of polyethylene terephthalate, polyacrylate, co-polyethylene terephthalate, and polylactide. The polymer resin is mixed with the biomass-derived polytrimethylene terephthalate at a weight ratio of 1:1.

The eco-friendly artificial leather for an interior of an automobile according to an exemplary embodiment of the present invention can be manufactured according to a method that is suitable for the reduction in greenhouse gas emissions and various environmental regulations. The method includes sequentially stacking a bio urethane-containing skin surface layer which uses biomass-derived components extracted from vegetable components, a solvent-free bio urethane adhesive layer, and a bio fiber base layer to produce an artificial leather. An advantage of the method is that it minimizes the use of organic solvents and components harmful to the human body.

It is also possible to utilize the eco-friendly product in an interior of an automobile, which requires a high durability performance. In some embodiments, the automobile is an eco-friendly automobile such as, but not limited to, a hydrogen vehicle, an electric vehicle, and a hybrid vehicle.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in more detail through an exemplary embodiment.

Figure 1:
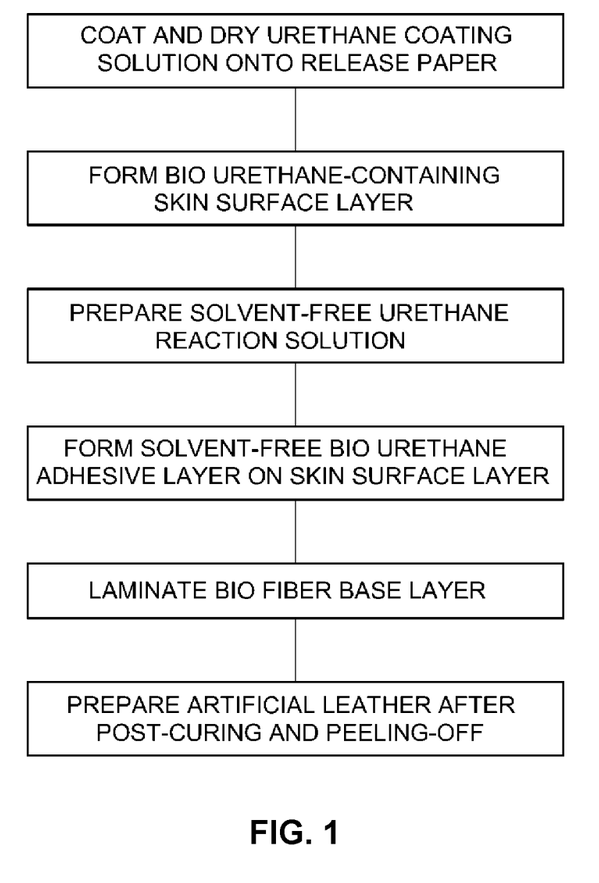
FIG. 1 is a schematic view illustrating a process of manufacturing the artificial leather according to an exemplary embodiment of the present invention.

The eco-friendly artificial leather for an interior of an automobile of the present invention has a bio urethane-containing skin surface layer 100; a solvent-free bio urethane adhesive layer 200; and a bio fiber base layer 300 that are sequentially stacked. The solvent-free bio urethane adhesive layer 200 includes a hydroxyl group end urethane prepolymer prepared by polymerizing 2 to 5 parts by weight of an isocyanate-based compound with 100 parts by weight of a polyol mixture including (1) a carbonate polyol having a functionality of 2 or more and a number average molecular weight of 500 to 3,000, (2) a biomass-derived crystalline ester polyol having a solidification temperature of 18° C. to 55° C. and a number average molecular weight of 1,000 to 3,000, and (3) a biomass-derived chain extender having a functionality of 3 or more and a number average molecular weight of 50 to 500. And, the bio fiber base layer 300 includes a composite spun fiber composed of a composite spun filament yarn including a polymer resin and a biomass-derived polytrimethylene terephthalate. The polymer resin is selected from the group consisting of polyethylene terephthalate, polyacrylate, co-polyethylene terephthalate, and polylactide. And, the polymer resin is mixed with the biomass-derived polytrimethylene terephthalate at a weight ratio of 1:1.

In an exemplary embodiment of the present invention, the term "biomass" refers to a bio alcohol-based polymer polymerization raw material synthesized from sugars extracted from cellulose of one or more reproducible vegetable components selected from the group including woody vegetable resources including corn, wheat, soybean, and sugar cane.

In an exemplary embodiment of the present invention, the term "green carbon ($C_{14}$)" refers to an isotope of carbon present in biomass extracted from vegetable components as an index of reduction in greenhouse gas emissions. The green carbon ($C_{14}$) is a material which is present in a trace amount in all the living creatures, and is gradually decayed as time elapses and disappears at last due to the unstable characteristics. The presence of a content of the green carbon ($C_{14}$) demonstrates that the green carbon ($C_{14}$) is a material derived from organisms, and the carbon is not present in an object synthesized from raw materials extracted from petroleum. For the present reason, the proof of the presence of the green carbon ($C_{14}$) is a very important factor as a measure of an eco-friendly material.

Hereinafter, each constituent component of the eco-friendly artificial leather according to an exemplary embodiment of the present invention will be described in detail as follows.

(a) Bio Urethane-Containing Skin Surface Layer 100

A urethane for a skin surface used in an exemplary embodiment of the present invention may use a bio polyurethane resin obtained by addition-reacting a polyol mixture which includes a polycarbonate polyol as a main raw material and includes about 5 to 15 wt % (e.g., about 5 wt %, 6, 7, 8, 9, 10, 11, 12, 13, 14, or about 15 wt %) of a biomass-derived ester-based polyol and about 1 to 5 wt % (e.g., about 1 wt %, 2, 3, 4, or about 5 wt %) of a chain extender with an aliphatic or alicyclic polyisocyanate such as hexamethylene diisocyanate (HDI), isophorone diisocyanate (IPDI), and dicyclohexyl methane diisocyanate ($H_{12}$MDI). The bio urethane-including skin surface layer 100 may have a green carbon ($C_{14}$) content of 5 to 15% (e.g., about 5 wt %, about 6 wt %, about 7 wt %, about 8 wt %, about 9 wt %, about 10 wt %, about 11 wt %, about 12 wt %, about 13 wt %, about 14 wt %, or about 15 wt %).

(b) Solvent-Free Bio Urethane Adhesive Layer 200

A solvent-free bio urethane adhesive layer 200 in an exemplary embodiment of the present invention may include about 10 to 30 parts by weight (e.g., about 10 parts by weight, 11, 12, 13, 14, 15, 16, 17, 18, 19, 20, 21, 22, 23, 24, 25, 26, 27, 28, or about 30 parts by weight) of an isocyanate-based compound and about 0.01 to 5 parts by weight (e.g., about 0.01 parts by weight, about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4.1, 4.2, 4.3, 4.4, 4.5, 4.6, 4.7, 4.8, 4.9, or about 5 parts by weight) of a curing catalyst in 100 parts by weight of a hydroxyl group end urethane prepolymer. The solvent-free bio urethane adhesive layer 200 may have a green carbon ($C_{14}$) content of about 15 to 35% (e.g., about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, or about 35%).

When the solvent-free bio urethane adhesive is prepared, a bio urethane adhesive layer in which micropores are formed may be formed by further including stirring a reaction mixture while injecting a nitrogen gas being a non-reactive gas into a high-speed stirrer at a rate of about 0.01 to 3 L/min (e.g., about 0.01 L/min, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.2, 1.5, 1.8, 2, 2.2, 2.5, 2.8, or about 3 L/min). A microporous solvent-free bio urethane adhesive layer 200 may be formed while injecting the nitrogen gas at a rate of preferably about 0.1 to 0.5 L/min (e.g., about 0.1, 0.11, 0.12, 0.13, 0.14, 0.14, 0.15, 0.16, 0.17, 0.18, 0.19, 0.2, 0.21, 0.22, 0.23, 0.24, 0.24, 0.25, 0.26, 0.27, 0.28, 0.29, 0.3, 0.31, 0.32, 0.33, 0.34, 0.34, 0.35, 0.36, 0.37, 0.38, 0.39, 0.4, 0.41, 0.42, 0.43, 0.44, 0.44, 0.45, 0.46, 0.47, 0.48, 0.49, or about 0.5 L/min), and more preferably 0.12 L/min.

(b-1) Hydroxyl Group End Urethane Prepolymer

The term "hydroxyl group end urethane prepolymer" used in an exemplary embodiment of the present invention refers to a prepolymer which includes a hydroxyl group (an —OH group) in an amount of about 1 to 3 wt % (e.g., about 1 wt %, about 2 wt %, or about 3 wt %) based on the total content of a urethane prepolymer in a form of a remaining hydroxyl group which is not reacted with isocyanate at both ends of a urethane prepolymer.

The hydroxyl group end urethane prepolymer of the present invention may be prepared by polymerizing about 2 to 5 parts by weight (e.g., about 2, about 3, about 4, or about 5 parts by weight) of an isocyanate-based compound with 100 parts by weight of a polyol mixture including a carbonate polyol having a functionality of 2 or more and a number average molecular weight of 500 to 3,000, a biomass-derived crystalline ester polyol having a solidification temperature of 18° C. to 55° C. and a number average molecular weight of 1,000 to 3,000, and a biomass-derived chain extender having a functionality of 3 or more and a number average molecular weight of 50 to 500.

The polyol mixture may include about 65 to 80 wt % (e.g., about 65 wt %, about 66%, about 67%, about 68%, about 69 wt %, about 70 wt %, about 71 wt %, about 72 wt %, about 73 wt %, about 74 wt %, about 75 wt %, about 76%, about 77%, about 78%, about 79 wt %, or about 80 wt %) of the carbonate polyol, about 18 to 26 wt % (e.g., about 18%, about 19 wt %, about 20 wt %, about 21 wt %, about 22 wt %, about 23 wt %, about 24 wt %, about 25 wt %, or about 26%) of the biomass-derived crystalline ester polyol, and about 2 to 9 wt % (e.g., about 2 wt %, about 3 wt %, about 4 wt %, about 5 wt %, about 6%, about 7%, about 8%, or about 9 wt %) of the biomass-derived chain extender. The ester polyol may be used in an amount of about 18 to 26 wt % (e.g., about 18%, about 19 wt %, about 20 wt %, about 21 wt %, about 22 wt %, about 23 wt %, about 24 wt %, about 25 wt %, or about 26%) based on the total weight of the polyol mixture, and when the content thereof is less than 18 wt %, there is a problem in that the content of green carbon is reduced, and when the content thereof is more than 26 wt %, there is a problem in that hydrolysis resistance deteriorates. By adjusting each component of the polyol mixture at a suitable ratio as described above, rigidity and strong cohesive force may be exhibited while having a suitable specific melting temperature and viscosity.

As the carbonate polyol, it is possible to use a carbonate polyol having a functionality of 2 or more and a number average molecular weight of 500 to 3,000. Specifically, the carbonate polyol may be synthesized by an ester exchange reaction and a condensation reaction of one or more hydroxy compounds selected from the group consisting of ethylene glycol, 1,3-propanediol, 1,4-butanediol, 1,5-pentanediol, 1,6-hexanediol, and cyclohexanediol with one or more ester compounds selected from the group consisting of alkylene carbonate, diaryl carbonate, and dialkyl carbonate. A polyurethane synthesized by utilizing the carbonate polyol shows excellent characteristics in terms of chemical resistance, hydrolysis resistance, weather resistance, and heat resistance, and thus may be used as a main raw material for a highly durable urethane.

The biomass-derived crystalline ester polyol having a number average molecular weight of 1,000 to 3,000 may be synthesized by a polycondensation reaction of one or more diols selected from the group consisting of ethylene glycol, 1,3-propanediol, 1,4-butanediol, and 1,6-hexanediol, which are extracted and produced from corn being a biomass raw material component with one or more acids selected from the group consisting of adipic acid (AA), sebacic acid (SA), and terephthalic acid. A polyurethane synthesized by utilizing a polyol derived from the biomass is excellent in terms of elasticity, restoring force, dimensional stability, cold resistance, and flexibility, and may be used as a main raw material for a carbon dioxide reducible eco-friendly urethane.

The biomass-derived chain extender having a number average molecular weight of 50 to 500 may be one or more selected from the group consisting of 1,3-propanediol, ethylene glycol, 1,2-propylene glycol, 1,4-butanediol, 1,6-hexanediol, methyl pentanediol, and diethylene glycol, which are extracted from corn being a biomass raw material component as a raw material. The chain extender may be used to design a urethane structure having excellent stiffness by increasing the cross-linking curing degree.

The isocyanate-based compound is an isocyanate used for the synthesis of the hydroxyl group end urethane prepolymer, and may be one or more selected from the group consisting of hexamethylene diisocyanate (HDI), isophorone diisocyanate (IPDI), dicyclohexyl methane diisocyanate ($H_{12}NDI$), xylene diisocyanate (XDI), and 4,4-diphenylmethane diisocyanate (MDI).

Based on 100 parts by weight of the hydroxyl group end urethane prepolymer, about 5 to 20 parts by weight (e.g., about 5, about 6, about 7, about 8, about 9, about 10, about 11, about 12, about 13, about 14, about 15, about 16, about 17, about 18, about 19, or about 20 parts by weight) of an inorganic filler may be further included when to improve the cushion (filling sense) of artificial leather. As the type of inorganic filler, it is possible to use one or more fillers having an average diameter of approximately 1 μm or less and selected from the group consisting of calcium carbonate, aluminum hydroxide, alumina, magnesium oxide, talc, and silica, but the inorganic filler is not limited thereto.

The hydroxyl group end urethane prepolymer is present in a crystallized solid form at room temperature, but may be melted at 60° C. or less by additionally reacting the polyol mixture with the isocyanate-based compound, and may be a 100% solid reactant synthesized from a biomass-derived raw material designed to form a rigid urethane bond and improve the production stability, reproducibility, and the like while showing a suitable viscosity.

The hydroxyl group end urethane prepolymer may have a melt viscosity of 2,000 to 8,000 cPs at 60° C., and may have a hydroxyl group content of about 1 to 3 wt % (e.g., about 1 wt %, about 2 wt %, or about 3 wt %) based on the total weight of the hydroxyl group end urethane prepolymer. The hydroxyl group end urethane prepolymer may have a melt viscosity of 3,500 to 6,500 cPs at 60° C. When the melt viscosity at 60° C. is less than 2,000 cPs, it is difficult to adjust a uniform thickness, and the cross-linking curing reaction is so slow that all the physical properties deteriorate, which is not preferred. In contrast, when the melt viscosity at 60° C. is more than 8,000 cPs, there is a problem in that there is a limitation in uniformly mixing the hydroxyl group end urethane prepolymer in a high-speed reaction molding machine, and the production stability deteriorates. It is efficient to melt and react the hydroxyl group end urethane prepolymer at a temperature of 40 to 70° C. (e.g., about 40° C., about 41° C., about 42° C., about 43° C., about 44° C., about 45° C., about 46° C., about 47° C., about 48° C., about 49° C., about 50° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., or about 70° C.) in consideration of production stability, production efficiency, gel time, reactivity, and the like.

When the hydroxyl group end urethane prepolymer has a melt temperature of less than 40° C., it takes a long time to melt the prepolymer, and in contrast, when the prepolymer has a melt temperature of less than 70° C. due to the high temperature of the urethane reaction solution, the cross-linking and curing reaction rapidly occurs during the coating process, wherein the gel time may become too short. Accordingly, it is difficult to achieve a uniform coating, and as a result, there is a problem in that the product uniformity deteriorates because a non-uniform solvent-free bio urethane adhesive layer 200 is formed.

(b-2) Isocyanate-Based Cross-Linking Agent Compound

As an isocyanate-based cross-linking agent compound used as a cross-linking agent of the hydroxyl group end urethane prepolymer, it is possible to use an isocyanate group end prepolymer, a carbodiimide-modified MDI, a burette-type HDI, an isocyanurate-type HDI, and the like, which may be reacted with an active hydrogen of a hydroxyl group in the molecular structure as a reactant of a low-molecular weight polyol and isocyanate, either alone or in mixture of two or more thereof.

The isocyanate-based compound may be used in an amount of about 1.05 to 2.5 equivalents (e.g., about 1.05, 1.06, 1.07, 1.08, 1.09, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, 2.0, 2.01, 2.02, 2.03, 2.04, 2.05, 2.06, 2.07, 2.08, 2.09, 2.1, 2.11, 2.12, 2.13, 2.14, 2.15, 2.16, 2.17, 2.18, 2.19, 2.2, 2.21, 2.22, 2.23, 2.24, 2.25, 2.26, 2.27, 2.28, 2.29, 2.3, 2.31, 2.32, 2.33, 2.34, 2.35, 2.36, 2.37, 2.38, 2.39, 2.4, 2.41, 2.42, 2.43, 2.44, 2.45, 2.46, 2.47, 2.48, 2.49, or about 2.5 equivalents) based on 1 equivalent of the hydroxyl group end urethane prepolymer. When the content is less than 1.05 equivalents based on 1 equivalent of the hydroxyl group end urethane prepolymer, the cross-linking and curing degree is so insufficient that adhesive strength and all the physical properties deteriorate, and when the content is more than 2.5 equivalents, the amount of unreacted isocyanate remaining is so large that there may occur a problem in that the product uniformity deteriorates while hydrolysis resistance, chemical resistance, adhesive strength, and the like deteriorate.

(b-3) Curing Catalyst

As an urethanized curing catalyst, a publicly known curing catalyst may be used without being particularly limited. For example, the curing catalyst is triethylamine (trade name: Dabco 33LV), bis(dimethylaminoether) (trade name: Dabco BL-11), N,N-dimethylcyclohexylamine (Polycat-8), tris-dimethyl amino propyl amine (Polycat-9), n-butyltin diacetate, 1,8-bicyclo(5,4,0)undecane (DBU), DBU-octyl acid salt, and the like, and these curing catalysts may be used either alone or in combination thereof.

(c) Bio Fiber Base Layer 300

A bio fiber base layer 300 used in an exemplary embodiment of the present invention may be composed of a nonwoven fabric layer including about 30 to 50 wt % (e.g., about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, or about 50 wt %) of a composite spun fiber, about 25 to 35 wt % (e.g., about 25 wt %, about 26 wt %, about 27 wt %, about 28 wt %, about 29 wt %, about 30 wt %, about 31 wt %, about 32 wt %, about 33 wt %, about 34 wt %, or about 35 wt %) of a nylon fiber, and about 25 to 35 wt % (e.g., about 25 wt %, about 26 wt %, about 27 wt %, about 28 wt %, about 29 wt %, about 30 wt %, about 31 wt %, about 32 wt %, about 33 wt %, about 34 wt %, or about 35 wt %) of a polyester fiber, or a composite nonwoven fabric layer in which a reinforcing layer including a biomass-derived polytrimethylene terephthalate is formed on the nonwoven fabric layer.

As the biomass-derived polytrimethylene terephthalate, it is possible to use a biomass-derived polytrimethylene terephthalate formed by polycondensating 1,3-propanediol derived from biomass with terephthalic acid.

The composite spun fiber may include a composite spun filament yarn in which one polymer resin selected from the group consisting of polyethylene terephthalate (PET), polyacrylate (PA), co-polyethylene terephthalate (co-PET), and polylactide (PLA) is mixed with a biomass-derived polytrimethlyene terephthalate (PTT) at a weight ratio of 1:1. More specifically, the composite spun fiber may be a bio PPT/PET composite spun filament yarn or a sea-island type or division-type filament yarn including one or more selected from the group consisting of PTT/PA, PTT/Co-PET, and PTT/PLA. The composite spun fiber may have a denier of 2 to 3 (e.g., about 2 de, 2.1, 2.2, 2.3, 2.4, 2.5, 2.6, 2.7, 2.8, 2.9, or about 3 de) and an average fiber length of about 40 to 60 mm (e.g., about 40 mm, 41, 42, 43, 44, 45, 46, 47, 48, 49, 50, 51, 52, 53, 54, 55, 56, 57, 58, 59, or about 60 mm).

The nonwoven fabric layer may include a nonwoven fabric in which a nylon staple fiber having a denier of 1 to 2.5 (e.g., about 1 de, 1.1, 1.2, 1.3, 1.4, 1.5, 1.6, 1.7, 1.8, 1.9, 2.0, 2.1, 2.2, 2.3, 2.4, 2.5 de) and an average fiber length of 40 to 60 mm (e.g., about 40 mm, 41, 42, 43, 44, 45, 46, 47, 48, 49, 50, 51, 52, 53, 54, 55, 56, 57, 58, 59, or about 60 mm) and a polyester fiber are mixed with the composite spun fiber. Since the nylon fiber has a high elasticity and good sound absorption properties and the polyester fiber has excellent heat shrinkage characteristics, the fiber base density is enhanced, wherein the cushion and texture are improved.

The composite nonwoven layer may be composed in a form where a reinforcing layer including a reinforcing fabric including a biomass-derived polytrimethylene terephthalate is stacked on the nonwoven fabric layer. When the aforementioned reinforcing layer is additionally further formed, a better sensitivity and an improvement in stretchability may be expected during the processing of the artificial leather.

The bio fiber base layer 300 may have a weight per unit area of about 200 to 300 g/m$^2$ (e.g., about 200, 205, 210, 215, 220, 225, 230, 235, 240, 245, 250, 255, 260, 265, 270, 275, 280, 285, 290, 295, or about 300 g/m$^2$) and a green carbon ($C_{14}$) content of 1 to 20 wt % (e.g., about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %). At the present time, when the weight per unit area is less than 200 g/m$^2$, the density is so low that the adhesive is abundantly absorbed in a fabric material, and as a result, the quality and sensitivity may deteriorate, and when the weight per unit area is more than 300 g/m$^2$, the nonwoven fabric is so stiff that the excellent elasticity and soft texture cannot be implemented.

In some aspects of the present invention, the method for manufacturing the eco-friendly artificial leather for an interior of an automobile of the present invention includes: (a) forming a bio urethane skin surface layer on a release paper; (b) forming a solvent-free bio urethane adhesive layer 200 by applying a solvent-free bio urethane composition onto the bio urethane skin surface layer; and (c) forming a bio fiber base layer 300 on the solvent-free bio urethane adhesive layer 200, in which the solvent-free bio urethane adhesive composition includes a hydroxyl group end urethane prepolymer prepared by polymerizing about 2 to 5 parts by weight (e.g., about 2, 3, 4, or about 5 parts by weight) of an isocyanate-based compound with 100 parts by weight of a polyol mixture including a carbonate polyol having a functionality of 2 or more and a number average molecular weight of 500 to 3,000, a biomass-derived crystalline ester polyol having a solidification temperature of about 18° C. to 55° C. (e.g., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., or about 55° C.,) and a number average molecular weight of 1,000 to 3,000, and a biomass-derived chain extender having a functionality of 3 or more and a number average molecular weight of 50 to 500, and the bio fiber base layer 300 includes a composite spun fiber in which one polymer resin selected from the group consisting of polyethylene terephthalate, polyacrylate, co-polyethylene terephthalate, and polylactide is mixed with a biomass-derived polytrimethylene terephthalate at a weight ratio of 1:1.

Step (b) may further include preparing a solvent-free bio urethane adhesive layer 200 having micropores formed therein by injecting a nitrogen gas, being a non-reactive gas, into a high-speed stirrer at a rate of about 0.01 to 3 L/min (e.g., about 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.2, 1.5, 1.8, 2, 2.2, 2.5, 2.8, or about 3 L/min).

Accordingly, the eco-friendly artificial leather for an interior of an automobile according to an exemplary embodiment of the present invention can manufacture an eco-friendly product suitable for reduction in greenhouse gas emissions and various environmental regulations by sequentially stacking a bio urethane-containing skin surface layer 100 which uses biomass-derived components extracted from vegetable components, a solvent-free bio urethane adhesive layer 200, and a bio fiber base layer 300 to minimize the use of organic solvents and components harmful to the human body.

It is also possible to utilize the eco-friendly product as an interior of an automobile, which requires a high durability performance from an eco-friendly automobile such as a hydrogen vehicle, an electric vehicle, and a hybrid vehicle using the same.

EXAMPLES

The following examples illustrate the invention and are not intended to limit the same.

Synthesis of Hydroxyl Group End Urethane Prepolymer

Synthesis Example 1

70 wt % of a carbonate polyol having a number average molecular weight of 2,000 (Ube Industries, Ltd., UH-200), 26 wt % of a biomass-derived crystalline ester polyol (a number average molecular weight of 2,000, Songwon Chemical Co., Ltd., SS-236), and 4 wt % of bio 1,3 propanediol (Susterra, DuPont Tate & Lyle Bio Products) were disposed into a reactor, and the resulting mixture was uniformly mixed at 70° C. to 80° C. for 30 minutes. After the reactor was cooled to a temperature of approximately 65° C. in consideration of an exothermic reaction, 4.5 parts by weight of 4,4-diphenylmethane diisocyanate (MDI, trade name: Cosmonate, product manufactured by Kumho Mitsui Chemicals Corp.) was added to 100 parts by weight of the polyol mixture, and then the resulting mixture was reacted for approximately 3 hours to obtain a hydroxyl group end prepolymer-1 (an OH group content of 2.67 wt %).

Synthesis Example 2

A polyol mixture was prepared under the same conditions as in Synthesis Example 2, and the reactor was cooled to a temperature of approximately 60° C. in consideration of an exothermic reaction. Thereafter, 3 parts by weight of 4,4-diphenylmethane diisocyanate (MDI, trade name: Cosmonate, product manufactured by Kumho Mitsui Chemicals Corp.) was added to 100 parts by weight of the polyol mixture, and then the resulting mixture was reacted for approximately 3 hours to obtain a hydroxyl group end prepolymer-1 (an OH group content of 2.9 wt %).

Synthesis Example 3

A hydroxyl group end prepolymer-3 (an OH group content of 2.7 wt %) was obtained by reaction in the same manner as in Synthesis Example 1, except that isocyanate was changed into dicyclohexyl methane diisocyanate ($H_{12}$MDI).

Preparation of Solvent-Free Urethane-Type Adhesive Film

Example 1

100 parts by weight of the hydroxyl group end urethane prepolymer-1 in Synthesis Example 1 was heated and melted at 60° C., and then maintained at 60° C. in an insulating container. Subsequently, 26 parts by weight of an isocyanate-based compound (trade name: Cosmonate LL, Kumho Mitsui Chemicals Corp., Modified MDI, an NCO content of 28.5 wt %) and 0.5 part by weight of a curing catalyst (Polycat-8, Air products) mixed liquid were stirred at a high speed of about 3,000 rpm in a high-speed stirrer for 2 seconds to obtain a reaction mixture. The reaction mixture was coated and applied to have a thickness of 250 μm onto a release paper, heated at a temperature of 110 to 135° C. for 3 minutes, and then dried. And then, the reaction mixture was cross-linked and cured, and then the release paper was left to stand at approximately 70° C. for 24 hours to prepare a solvent-free bio urethane adhesive film.

Example 2

The hydroxyl group end prepolymer-1 in Synthesis Example 1 was used and stirred while injecting a nitrogen gas, being a non-reactive gas, into a high-speed stirrer at a rate of 0.12 L/min under the same conditions as in Example 1 to prepare a solvent-free bio urethane adhesive film having micropores formed therein.

Example 3

The hydroxyl group end prepolymer-2 in Synthesis Example 2 was used to prepare a solvent-free bio urethane adhesive film under the same conditions as in Example 1.

Example 4

The hydroxyl group end prepolymer-3 in Synthesis Example 3 was used to prepare a solvent-free bio urethane adhesive film under the same conditions as in Example 1.

Example 5

The hydroxyl group end prepolymer-3 in Synthesis Example 3 was used, and an isocyanate-based compound was stirred with 18 parts by weight of hexamethylene diisocyanate (HDI) and 0.8 part by weight of a curing catalyst (Polycat-8, Air products) mixed solution at approximately 3,000 rpm for 2 seconds in a high-speed stirrer to obtain a reaction mixture. In the subsequent process, a solvent-free bio urethane adhesive film was prepared under the same conditions as in Example 1.

Comparative Example 1

100 parts by weight of an isocyanate group end urethane prepolymer (PTMG-2000, HG/AA-2000, XDI-type prepolymer, an NCO content of 2.1 wt %) were heated and melted at 120 (HDI) and 0.8 part by weight of a curing catalyst (Polycat-8 parts by weight of a colorant, and 2 parts by weight of a diluent were stirred at a high speed of 5,000 rpm for 2 seconds in a high-speed stirring molding machine to obtain a reaction mixture. The reaction mixture was discharged onto a release paper, coated to have a thickness of 250 μm, and left to stand at room temperature under a 65% relative humidity atmosphere for 72 hours, obtaining an adhesive film.

Test Examples

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

Test Example 1: Measurement of Physical Properties of Solvent-Free Bio Urethane Adhesive Film Measurement of Melt Viscosity The adhesive films in Examples 1 to 5 and Comparative Example 1 were observed at a given measurement temperature using a cone-plate viscometer.

Tensile Characteristics

For the adhesive films in Examples 1 to 5 and Comparative Example 1, the tensile characteristics were measured in accordance with KS M 6782, ASTM D-412, and JIS K7311.

Hydrolysis Resistance

For the adhesive films in Examples 1 to 5 and Comparative Example 1, a change in appearance was observed after the hydrolysis resistance test under experimental conditions of 110° C., 99% relative humidity, and 48 hours.

Peeling Strength

An interlayer peeling strength of a sheet was measured in accordance with KS M 0533 and JIS K 6854 by heat-fusing a hot-melt cloth tape having a width of 25 mm at 130° C. for 5 seconds on both surfaces of the adhesive films in Examples 1 to 5 and Comparative Example 1.

Green Carbon Content

The green carbon content measurement method ASTM-D6866-12 (% biobased carbon content) measured the biomass contents of the adhesive films in Examples 1 to 5 and Comparative Example 1 by a radioactive carbon analysis technique.

house gas emissions was increased as compared to the total carbon while maintaining excellent physical properties including the tensile strength, elongation, and peeling strength by using a solvent-free urethane adhesive film prepared by using a polyester polyol extracted from biomass, a chain extender, and the like.

The aging time for preparing a test specimen was observed. The aging time for preparing a test specimen of Examples 1 to 5 was significantly faster than Comparative Example 1. It could be seen that the time for the processing process was reduced because the urethane binder has excellent cross-linking curability and also has excellent dimensional stability due to the fast solidification rate.

Preparation of Fiber Base Layer

Example 6

35 wt % of a composite spun fiber having 2.5 de and a fiber length of 51 mm (constitution: 50 wt % of PET/50 wt % of bio PTT), 30 wt % of a typical nylon (PA) staple fiber having 2 de and a fiber length of 51 mm, and 35 wt % of a highly shrinkable polyester (PET) staple fiber having 1.4 de and a fiber length of 51 mm and heat shrinkage characteristics were mixed to prepare a nonwoven fabric web according to a typical method for preparing a dry nonwoven fabric.

A mixed fiber web subjected to carding treatment and a mixed fiber fleece were made, and then a needle punching was performed under a condition of a punching per square centimeter (PPSC) of about 1,200 times/cm$^2$ and the fibers were combined to prepare a fiber base layer composed of a nonwoven layer having a weight per unit area of approximately 240 to 250 g/m$^2$, a thickness of approximately 1.0 mm, and a green carbon ($C_{14}$) content of 7 wt %.

TABLE 1

| Classification | Comparative Example 1 | Example 1 | Example 2 | Example 3 | Example 4 | Example 5 |
|---|---|---|---|---|---|---|
| Prepolymer viscosity [cPs] | — | 5,500 | 5,500 | 6,000 | 5,000 | 5,000 |
| Aging period | 72 hours | 24 hours | 24 hours | 24 hours | 24 hours | 24 hours |
| Tensile characteristics — Tensile strength [Kg$_f$/cm$^2$] | 312 | 352 | 335 | 345 | 342 | 338 |
| Elongation [%] | 432 | 398 | 485 | 492 | 488 | 470 |
| Peeling strength [Kg$_f$/cm] | 2.6 | 3.3 | 2.9 | 3.1 | 3.2 | 3.4 |
| Hydrolysis Resistance | Gloss generated | No change | No change | No change | No change | No change |
| Green carbon content[1] [wt %] | — | 27.8 | 27.8 | 20.6 | 27.8 | 29.7 |

Note
[1] The green carbon content is a value based on the total amount of carbon.

According to the result in Table 1, it was confirmed that in the case of Comparative Example 1, an isocyanate group end urethane prepolymer including an NCO content of 2.1 wt % was used, and as a result, the aging time was great, and the peeling strength was reduced because foaming caused by moisture curing was generated in abundance. Furthermore, it was confirmed that the green carbon content was not detected at all because a polyurethane prepared by using a petroleum chemical raw material was used.

In contrast, it was confirmed that in the case of Examples 1 to 5, an artificial leather was successfully processed by using a biomass raw material from the observation that the green carbon content being an index of reduction in green- Example 7

45 wt % of a composite spun fiber having 2.5 de and a fiber length of 51 mm (constitution: 50 wt % of PET/50 wt % of bio PTT), 30 wt % of a typical nylon (PA) staple fiber having 2 de and a fiber length of 51 mm, and 25 wt % of a highly shrinkable polyester (PET) staple fiber having 1.4 de and a fiber length of 51 mm and heat shrinkage characteristics were mixed to prepare a nonwoven fabric web according to a typical method for preparing a dry nonwoven fabric.

Thereafter, a yarn obtained by twining 17 strands of a bio PTT long fiber having 2.5 de was used in a lead-free form to join and introduce a reinforcing fabric weaved from a plain weave with 50 warp threads by 50 weft threads per inch of weaving density and having a unit weight of 28 g/m² into the bottom of the nonwoven fabric web, needle punching was performed under a condition of a punching per square centimeter (PPSC) of approximately 1,300 times/cm² and the fibers were combined to prepare a fiber base layer including a composite nonwoven layer. The prepared fiber base layer had a weight per unit area of about 240 to 250 g/m² and a thickness of approximately 1.0 mm, and the product had a green carbon ($C_{14}$) content of 13 wt %.

Preparation of Artificial Leather Product

Example 8

A blended liquid prepared by mixing a bio polyurethane resin for surface coating (D-Ace-7000B, manufactured by Dongsung Chemical Co., Ltd.), dimethyl formamide (DMF), methyl ethyl ketone (MEK), and other additives (pigment and thickener) at a ratio of 60 wt %, 5 wt %, 30 wt %, and 5 wt %, respectively was applied to have a thickness of 80 μm onto a release paper. Immediately, the resulting release paper was pre-dried at 80° C. for 1 minute, and then dried at 130° C. for 3 minutes to form a bio urethane skin surface layer film.

The reaction mixture prepared in Example 1 was coated and applied to have a thickness of 250 μm onto the urethane skin surface layer film, heated at a temperature of 110 to 135° C. for 3 minutes, and then dried. Then, the reaction mixture was cross-linked and cured, and the release paper was left to stand at approximately 70° C. for 24 hours to prepare a film of solvent-free bio urethane adhesive layer 200.

Then, the bio fiber base layer 300 prepared in Example 6 was laminated with the urethane adhesive layer, and the laminate was cured at approximately 70° C. for 24 hours to manufacture an eco-friendly artificial leather product for an interior of an automobile.

Example 9

Figure 2:
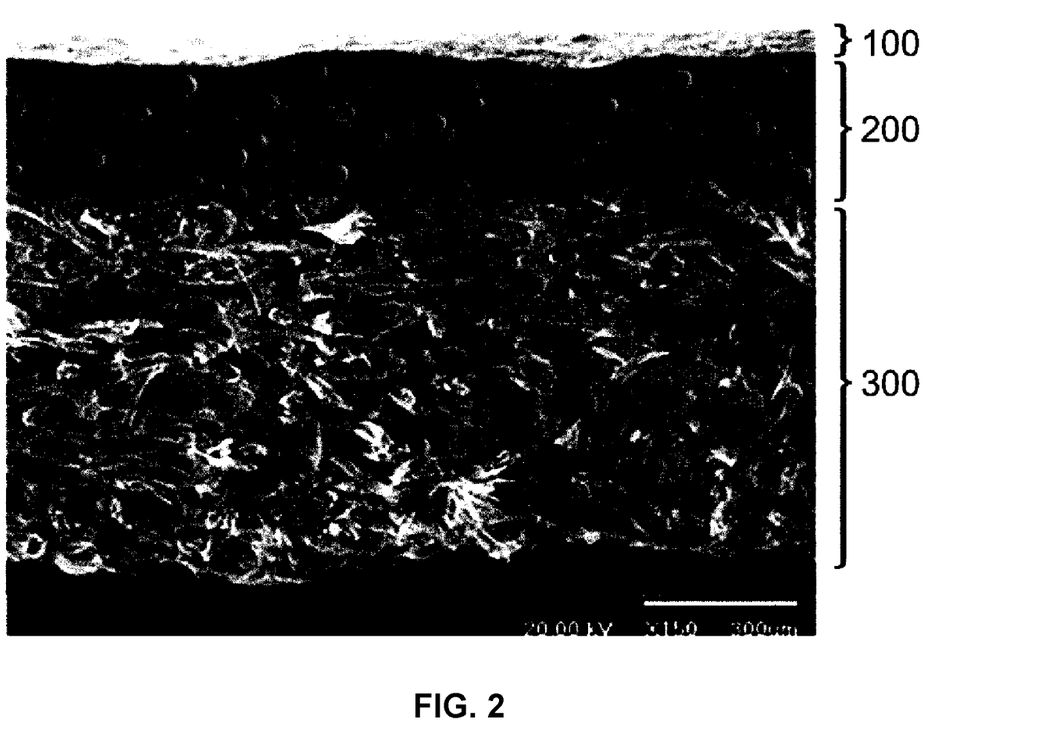
FIG. 2 is a photograph of a cross-sectional surface of the artificial leather manufactured in Example 9 of the present invention, which is observed by a scanning electron microscope (SEM).
Figure 3:
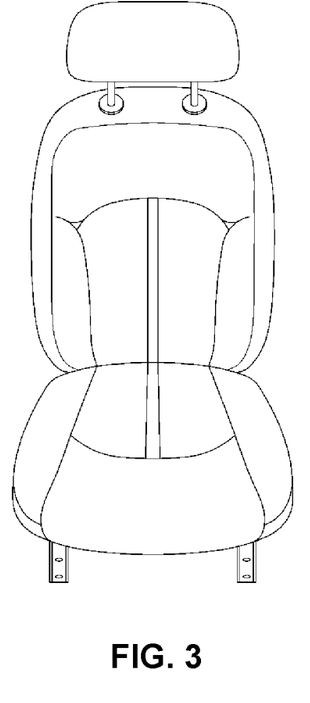
FIG. 3 is a schematic view of a vehicle seat utilizing an artificial leather according to an exemplary embodiment of the present invention.

An artificial leather product was manufactured in the same manner as in Example 8, except that the film of the solvent-free bio urethane adhesive layer 200 in Example 2 was used.

Example 10

An artificial leather product was manufactured in the same manner as in Example 8, except that the film of the solvent-free bio urethane adhesive layer 200 in Example 3 was used.

Example 11

An artificial leather product was manufactured in the same manner as in Example 8, except that the film of the solvent-free bio urethane adhesive layer 200 in Example 3 was used.

Example 12

An artificial leather product was manufactured in the same manner as in Example 8, except that the bio fiber base layer 300 prepared in Example 7 was laminated.

Comparative Example 2

100 parts by weight of an isocyanate group end urethane prepolymer (PTMG-2000, HG/AA-2000, XDI-type prepolymer, an NCO content of 2.1 wt %) were heated and melted at 120° C. and maintained at 120° C. in an insulating tank, and 12 parts by weight of PPG-5,000 (Kumho Petrochemical), 8 parts by weight of a colorant, and 2 parts by weight of a diluent were stirred at a high speed of 5,000 rpm for 3 seconds in a high-speed stirring molding machine to obtain a reaction mixture. The prepared reaction mixture was discharged to have a thickness of 150 μm onto a release paper coated with a urethane resin and dried, then heated at a temperature gradient of 100 to 140° C. for approximately 3 minutes, and then dried. Thereafter, a binder layer including a moisture curable polyurethane hot-melt resin was cross-linked and cured, and laminated with a fiber base including a staple fiber nonwoven fabric to manufacture artificial leather. Subsequently, the artificial leather was cured at 70° C. for 24 hours to obtain an artificial leather product for an interior of an automobile.

Comparative Example 3

100 parts by weight of an isocyanate group end urethane prepolymer (NCO prepolymer/PTMG-2000, PPG-6000 (a trifunctional group)-type prepolymer, and an NCO content of 12.5 wt %), 70.46 parts by weight of a cross-linking agent (PPG-2000/PPG-6000 (a trifunctional group)/1,4-BG/a catalyst, a weight ratio of 70/15/15/0.06), and 2 parts by weight of a diluent were stirred at 5,000 rpm for 3 seconds in a high-speed stirring molding machine by a separate line to obtain a reaction mixture. Thereafter, artificial leather was manufactured in the same manner as in Comparative Example 2.

Test Example 2: Measurement of Physical Properties of Artificial Leather Product For the artificial leather manufactured in Examples 8 to 12 and Comparative Examples 2 and 3, physical properties were measured in the same manner as in Test Example 1.

TABLE 2

| Classification | Comparative Example 2 | Comparative Example 3 | Example 8 | Example 9 | Example 10 | Example 11 | Example 12 |
|---|---|---|---|---|---|---|---|
| Light fastness [degree] | 3.5 | 3.0 | 3.5 | 4.0 | 3.5 | 4.5 | 4.0 |
| Friction colorability [Grade] | 3.0 | 3.0 | 4.0 | 4.0 | 4.0 | 4.0 | 4.0 |
| Peeling Strength [Kg/cm] | 1.6 | 1.9 | 2.8 | 2.6 | 2.5 | 2.9 | 2.5 |
| Heat aging resistance (120° C., 48 hr) [Grade] | 3.5 | 3.0 | 4.0 | 4.0 | 4.0 | 4.0 | 4.5 |

TABLE 2-continued

| Classification | Comparative Example 2 | Comparative Example 3 | Example 8 | Example 9 | Example 10 | Example 11 | Example 12 |
|---|---|---|---|---|---|---|---|
| Total volatile organic compounds (TVOCs) [ppm] | 30 | 78 | 3.2 | 2.9 | 3.5 | 3.6 | 2.8 |
| Green carbon content [wt %] | 0 | 0 | 17 | 18 | 15 | 20 | 23 |

According to the results in Table 2, it was confirmed that when a polyurethane prepared by using a petroleum chemical raw material was applied in the case of Comparative Examples 2 and 3, the overall mechanical properties showed lower numerical values than that in Examples 8 to 12. Furthermore, from the result that the concentrations of the volatile organic compounds were very high, it could be seen that harmful components were remaining in the artificial leather because organic solvents were used.

In contrast, it was confirmed that in the case of Examples 8 to 12, physical properties including light fastness, friction colorability, and peeling strength were excellent on the whole, and the concentrations of the volatile organic compounds were significantly reduced. Furthermore, from the result that the green carbon content was 15 wt % or more, it could be confirmed that biomass PU artificial leather was successfully processed by using a biomass raw material.

For convenience in explanation and accurate definition in the appended claims, the terms "upper", "lower", "up", "down", "upwards", "downwards", "inner", "outer", "inside", "outside", "inwardly", "outwardly", "interior", "exterior", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various alternatives and modifications thereof. It is intended that the scope of is the invention be defined by the Claims appended hereto and their equivalents.

What is claimed is:

1. An eco-friendly artificial leather for an interior of an automobile, wherein a bio urethane-containing skin surface layer; a solvent-free bio urethane adhesive layer; and a bio fiber base layer are sequentially stacked,
    wherein the solvent-free bio urethane adhesive layer comprises a hydroxyl group end urethane prepolymer prepared by polymerizing 2 to 5 parts by weight of an isocyanate-based compound with 100 parts by weight of a polyol mixture comprising: (1) a carbonate polyol having a functionality of 2 or more and a number average molecular weight of 500 to 3,000, (2) a biomass-derived crystalline ester polyol having a solidification temperature of 18° C. to 55° C. and a number average molecular weight of 1,000 to 3,000, and (3) a biomass-derived chain extender having a functionality of 3 or more and a number average molecular weight of 50 to 500, and
    the bio fiber base layer comprises a composite spun fiber comprising a polymer resin and a biomass-derived polytrimethylene terephthalate,
    wherein the polymer resin selected from the group consisting of polyethylene terephthalate, polyacrylate, co-polyethylene terephthalate, and polylactide, and the polymer resin is mixed with the biomass-derived polytrimethylene terephthalate at a weight ratio of 1:1.

2. The eco-friendly artificial leather of claim 1, wherein the polyol mixture comprises about 65 to 80 wt % of the carbonate polyol, about 18 to 26 wt % of the biomass-derived crystalline ester polyol, and about 2 to 9 wt % of the chain extender.

3. The eco-friendly artificial leather of claim 1, wherein the biomass-derived chain extender having a number average molecular weight of 50 to 500 is one or more selected from the group consisting of 1,3-propanediol, ethylene glycol, 1,2-propylene glycol, 1,4-butanediol, 1,6-hexanediol, methyl pentanediol, and diethylene glycol.

4. The eco-friendly artificial leather of claim 1, wherein the isocyanate-based compound is one or more selected from the group consisting of hexamethylene diisocyanate (HDI), isophorone diisocyanate (IPDI), dicyclohexyl methane diisocyanate ($H_{12}$MDI), xylene diisocyanate (XDI), and 4,4-diphenylmethane diisocyanate (MDI).

5. The eco-friendly artificial leather of claim 1, wherein the hydroxyl group end urethane prepolymer has a melt viscosity of about 2,000 to 8,000 cPs at 60° C., and has a hydroxyl group content of about 1 to 3 wt % based on a total weight of the hydroxyl group end urethane prepolymer.

6. The eco-friendly artificial leather of claim 1, wherein the solvent-free bio urethane adhesive layer comprises about 10 to 30 parts by weight of an isocyanate-based compound and about 0.01 to 5 parts by weight of a curing catalyst in 100 parts by weight of a hydroxyl group end urethane prepolymer.

7. The eco-friendly artificial leather of claim 1, wherein the solvent-free bio urethane adhesive layer has a green carbon ($C_{14}$) content of about 15 to 35 wt %.

8. The eco-friendly artificial leather of claim 1, wherein the biomass-derived polytrimethylene terephthalate is formed by polycondensating 1,3-propanediol derived from biomass with terephthalic acid.

9. The eco-friendly artificial leather of claim 1, wherein the bio fiber base layer is composed of a nonwoven fabric layer comprising about 30 to 50 wt % of a composite spun fiber, about 25 to 35 wt % of a nylon fiber, and about 25 to 35 wt % of a polyester fiber, or a composite nonwoven fabric layer in which a reinforcing layer composed of a biomass-derived polytrimethylene terephthalate is formed on the nonwoven fabric layer.

10. The eco-friendly artificial leather of claim 1, wherein the bio fiber base layer has a weight per unit area of about 200 to 300 g/m² and a green carbon ($C_{14}$) content of about 1 to 20 wt %.

11. A method for manufacturing an eco-friendly artificial leather for an interior of an automobile, the method comprising:
(a) forming a bio urethane skin surface layer on a release paper;
(b) forming a solvent-free bio urethane adhesive layer by applying a solvent-free bio urethane composition onto the bio urethane skin surface layer; and
(c) forming a bio fiber base layer on the solvent-free bio urethane adhesive layer,
wherein the solvent-free bio urethane adhesive composition includes a hydroxyl group end urethane prepolymer prepared by polymerizing about 2 to 5 parts by weight of an isocyanate-based compound with 100 parts by weight of a polyol mixture comprising (1) a carbonate polyol having a functionality of 2 or more and a number average molecular weight of 500 to 3,000, (2) a biomass-derived crystalline ester polyol having a solidification temperature of 18° C. to 55° C. and a number average molecular weight of 1,000 to 3,000, and (3) a biomass-derived chain extender having a functionality of 3 or more and a number average molecular weight of 50 to 500, and
the bio fiber base layer comprises a composite spun fiber comprising a polymer resin and a biomass-derived polytrimethylene terephthalate,
wherein the polymer resin is selected from the group consisting of polyethylene terephthalate, polyacrylate, co-polyethylene terephthalate, and polylactide, and the polymer resin is mixed with the biomass-derived polytrimethylene terephthalate at a weight ratio of 1:1.

12. The method of claim 11, wherein step (b) further comprises preparing a solvent-free bio urethane adhesive layer having micropores formed therein by injecting a non-reactive nitrogen gas into a high-speed stirrer at a rate of about 0.01 to 3 L/min.

* * * * *